US006212578B1

(12) United States Patent
Racicot et al.

(10) Patent No.: US 6,212,578 B1
(45) Date of Patent: Apr. 3, 2001

(54) METHOD AND APPARATUS FOR MANAGING DEPENDENCIES IN A DISTRIBUTED COMPUTING ENVIRONMENT FOR ENSURING THE SAFETY OF REMOTE PROCEDURE CALLS

(75) Inventors: Christopher Racicot, Mountain View; Usha Sundaram, Sunnyvale, both of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 08/711,772

(22) Filed: Sep. 9, 1996

(51) Int. Cl.$^7$ .................................................. G06F 1/12
(52) U.S. Cl. ............................................................ 709/330
(58) Field of Search .................. 395/684; 709/300–305; 713/100

(56) References Cited

U.S. PATENT DOCUMENTS

| | | | |
|---|---|---|---|
| 5,475,819 | * 12/1995 | Miller et al. | 395/200.03 |
| 5,511,197 | * 4/1996 | Hill et al. | 395/683 |
| 5,671,414 | * 9/1997 | Nicolet | 395/684 |
| 5,682,534 | * 10/1997 | Kapoor et al. | 395/684 |
| 5,778,228 | * 7/1998 | Wei | 395/684 |
| 5,887,172 | * 3/1999 | Vasudevan et al. | 709/304 |

OTHER PUBLICATIONS

Burke et al., "RPC Design for Real–Time Mach", Open Software Foundation/Research Institute, pp. 1–35, Apr. 12, 1994.*

Bloomer, John, "Distributed Computing and the OSF/DCE", Dr. Dobb's Journal, (33), Feb. 1995.*

Shapiro, et al., "Remote Procedure Calls", published on WWW:http://bumetb.bu.edu/~bruce/cs776/projects/fall97/shapiro/shapiro.htm, Dec. 1997.*

(No author given), "COBRA Security", published by OMG, pp. 80, 303, Dec. 1995.*

* cited by examiner

Primary Examiner—Alvin E. Oberley
Assistant Examiner—St. John Courtenay, III
(74) Attorney, Agent, or Firm—Hickman Palermo Truong & Becker, LLP; Edward A. Becker

(57) ABSTRACT

A method and apparatus for managing dependencies in a distributed environment to ensure the safety of remote procedure calls is disclosed. Each remote procedure call between a calling procedure and a target procedure includes an expected time stamp and expected signature associated with the target procedure. The expected time stamp contains the creation time of the target procedure at the time the calling procedure was last compiled. The expected signature contains data type information of the target procedure formal parameters at the time the calling procedure was last compiled.

The target procedure compares the expected time stamp to an actual time stamp maintained by the target procedure. If the two time stamps do not match, the target procedure compares the expected signature and an actual signature maintained by the target procedure to determine whether the data types of the formal parameters sent by the calling procedure are compatible with the data types expected by the target procedure. If the data types are compatible, then execution of the target procedure continues.

41 Claims, 6 Drawing Sheets

FIG. 4C

| | | |
|---|---|---|
| 2 | | Signature Version 2 |
| 5 | | Signature Length of 5 |
| 2 | 2 | 2 Parameter Descriptors |
| 3 | 0 | Data Type 3 = Integer, 0 = No Extra Information, 1 = Input Variable |
| 1 | 0 | Data Type 1 = Character, No Extra Information, 3 = Input/Output Variable |
| | 0 | 0 = No Data Structure Descriptors Associated With This Remote Procedure Call |

METHOD AND APPARATUS FOR MANAGING DEPENDENCIES IN A DISTRIBUTED COMPUTING ENVIRONMENT FOR ENSURING THE SAFETY OF REMOTE PROCEDURE CALLS

FIELD OF THE INVENTION

The present invention relates to distributed computing environments, and more specifically, to a method and apparatus for ensuring the safety of remote procedure calls in a distributed computing environment.

BACKGROUND OF THE INVENTION

In distributed computing environments where procedure calls are being made between remote sites, software compatibility problems can arise when the software at one or more of the sites is changed without a corresponding change in the software at the other sites. This typically occurs when procedures are changed and recompiled at one site but applications at other sites which depend upon those procedures are not recompiled. When this occurs, the application which depends upon the now updated procedure will often not work correctly or, under some circumstances, not at all. Throughout this application, the term "procedure" is used generically to refer to any form of software, such as units, modules, functions, subroutines or any other type of software, and is not meant to be limiting.

For example, consider FIG. 1 which illustrates a simple distributed environment with two remote sites, SITE1 and SITE2. CALLER1 100 is a procedure at SITE1 which calls TARGET1 102, a procedure at SITE2. Since this is a distributed environment, CALLER1 100 or TARGET1 102 may change at any time without a corresponding change to the other procedure, creating software incompatibilities. For example, TARGET1 102 may have been written to receive two integer values and CALLER1 100 written to pass two integer values. If TARGET1 102 is later changed to receive two character strings and then recompiled, the next time CALLER1 100 calls TARGET1 102, TARGET1 102 will most likely execute incorrectly or not at all.

Although the present problem has been presented in the context of software tasks running on different or remote physical sites, software incompatibilities also occur when remote procedure calls are made between different tasks running at the same site and even on the same processor.

Historically, several approaches have been used to manage dependencies in distributed computing environments to ensure compatibility during remote procedure calls. Four of these include (1) synchronized installation; (2) time stamps; (3) self-describing data; and (4) data type encoding.

The synchronized installation approach involves simultaneously installing software at all sites to ensure that all software dependencies between sites match. Typically, this is achieved through the implementation of strict software configuration management, and among the four approaches is most likely to ensure software compatibility between the sites. Moreover, synchronized installation does not adversely affect software performance since software overhead is unaffected. However, as the number of sites increases, it becomes significantly more difficult to maintain up-to-date object level compatibility between software at multiple sites. Consequently, this approach is only suited for a distributed environment with a limited number of sites.

The use of time stamps involves recording an actual creation time or "actual time stamp" of each top-level compilation unit and then checking that actual time stamp against an expected time stamp maintained by the calling procedure. Each time a compilation unit is compiled, the new actual creation time is stored as an actual time stamp. Similarly, each time a calling procedure is recompiled, the stored creation times for each compilation unit called are stored by the calling procedure as expected time stamps. Upon execution of a remote procedure call, the expected time stamp is then passed, usually in the parameter list, from the calling procedure to the target procedure and compared by the target procedure to the actual time stamp previously stored by the target procedure.

For example, referring again to FIG. 1, CALLER1 100 maintains an expected time stamp and passes it to TARGET1 102 each time it calls TARGET1 102. The expected time stamp is compared to the actual time stamp previously stored by TARGET1 102. If the expected time stamp passed by CALLER1 100 does not match the actual time stamp maintained by TARGET1 102, the call fails and CALLER1 100 is marked as needing to be recompiled. The next time an execution of CALLER1 100 is attempted, CALLER1 100 will automatically be recompiled if a compiler is available at SITE1. If a compiler is not available, then the execution of CALLER1 100 will be prohibited.

The time stamp approach has a high probability of detecting software incompatibilities because of the very low probability that two incompatible versions of a particular compilation unit would be compiled at the exact same time. Moreover, the time stamp approach has little adverse effects on performance since the time stamp only adds a few bytes (typically 8) to each remote procedure call.

However, the use of time stamps has several disadvantages. First, the time stamp approach requires that a compiler be available at each site. Second, the time stamp approach is very strict and inflexible and does not readily provide for evolutionary software development. This is because any change to a compilation unit upon which a calling procedure depends, will require the recompilation of all calling procedures which depend on that particular target procedure. This is true even if the change occurred in target procedures in the compilation unit not called by the calling procedure. These problems are exacerbated as the number of sites increase, making the use of this approach frustrating and cumbersome. Consequently, as with the synchronized installation approach, the time stamp approach is only practical for distributed environments having a limited number of sites.

Perhaps the most widely used approach for ensuring the safety of remote procedure calls in distributing computing environments is the use of self-describing data. With this approach, additional data is included in each remote procedure call which fully describes each parameter. This data typically includes type, mode, constraints, and any other meta-data required to fully describe the parameter and ensure correctness.

During execution, the self describing data is compared to the target procedure data types and if either the calling procedure or the target procedure has changed, the call will only be completed if the change is compatible, or if a valid conversion can be applied by the target procedure. This inherent flexibility is particularly helpful if the change is limited in scope and relatively benign. For example, a parameter in a target procedure may have changed from an integer value to a double precision real value. Although the calling procedure continues to pass an integer, the target procedure can easily convert the integer to a double precision real and then continue executing. In addition to providing the flexibility of data conversion, the self-describing data approach does not require a compiler at each site and is well suited for distributed environments with a large number of sites.

However, the self-describing data approach adversely affects performance in two ways. First, the self-describing data greatly increases the amount of data being passed in each remote procedure call. Secondly, the data type information is typically interleaved with the parameters, requiring that all of the parameters be checked before compatibility can be confirmed. Consequently, a difference in the last parameter will not be detected until all of the other parameters have been checked.

The last approach involves encoding the data type information of the formal parameters into a number which is then included in each remote procedure call as an additional parameter. The effectiveness of this approach depends upon the encoding scheme selected and how many bytes are used for the encoding. The encoding approach does not add much remote procedure call overhead and provides for data type conversions between compatible data types if the encoding scheme is sophisticated enough.

One common encoding method, "hashing", has the disadvantage that it lacks fine-grained control, yielding only a "compatible" or "not compatible" answer when comparing the expected hash number with the actual hash number. For example, assume a hash function "Hash", applied to a procedure "X", with two parameters of types "A" and "B", yields a single number "N". Change the prototype of "X" to have types "C" and "D" as its parameters. A good hash would assure with a high probability that given N=Hash (X(A,B)) and M=Hash (X(C,D)), that N does not equal M.

Using this functionality, one could quickly and easily determine whether a remote call is compatible with the current state of the target. However, it would be very difficult, if not impossible, to apply type-conversions, then redetermine compatibility.

Finally, hashes and other encoding schemes tend to be less extensible, since it is much easier to create an efficient, correct encoding when the entire data-set to be encoded is known. Adding a new element to the data-set can invalidate the entire hash.

In view of the problems created by software incompatibilities and the inherent limitations in each of the solutions described above, a method of managing dependencies in a distributed computing environment to ensure the safety of remote procedure calls which is easy to maintain, allows compatible changes with a minimal impact on overhead and which works well with many sites is highly desirable.

SUMMARY OF THE INVENTION

A method and apparatus are provided for managing dependencies in a distributed computing environment to ensure the safety of remote procedure calls between a calling procedure and a target procedure.

According to one aspect of the invention, each remote procedure call includes both an expected time stamp and an expected signature. The expected time stamp contains the creation time of the target procedure at the time the calling procedure was last compiled. The expected signature contains data type and passing mode information of the target procedure formal parameters at the time the calling procedure was last compiled.

Upon execution, the target procedure first compares the expected time stamp from the calling procedure to the actual time stamp stored by the target procedure when it was last compiled. If they match, then the target procedure has not been recompiled since the calling procedure was last compiled and execution of the target procedure continues normally. On the other hand, if the time stamps do not match, then the target procedure has been recompiled since the last time the calling procedure was last compiled and may have actually been changed. Therefore, the target procedure compares the expected signature to an actual signature stored by the target procedure. If the signatures match, then although the target procedure was recompiled, no change was made to the data types or parameter passing mode (in, out, in/out) of the formal parameters and execution of the target procedure continues normally. Otherwise, if the signatures do not match, then the target procedure determines whether a data type conversion can be applied to the incompatible formal parameters to convert them to the type required by the target procedure. If a data type conversion can be successfully applied, then it is applied and execution of the target procedure continues normally. However, if a data type conversion cannot be successfully applied, then execution of the target procedure is halted.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4C illustrates an example of the expected signature illustrated in FIG. 4A.

DETAILED DESCRIPTION OF THE PREFERRED EMBODIMENT

A method and apparatus for managing dependencies in a distributed computing environment to ensure the safety of remote procedure calls is described. In the following description, for the purposes of explanation, numerous specific details are set forth in order to provide a thorough understanding of the present invention. It will be apparent, however, to a person of ordinary skill in the art that the present invention may be practiced without these specific details. In other instances, well-known structures and devices are illustrated shown in block diagram form in order to avoid unnecessarily obscuring the present invention.

Hardware Overview

Figure 1:
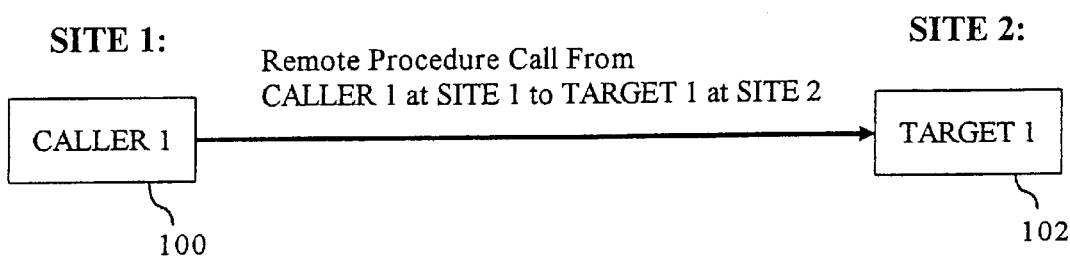
FIG. 1 is a block diagram illustrating a conventional distributed computing environment.
Figure 2:
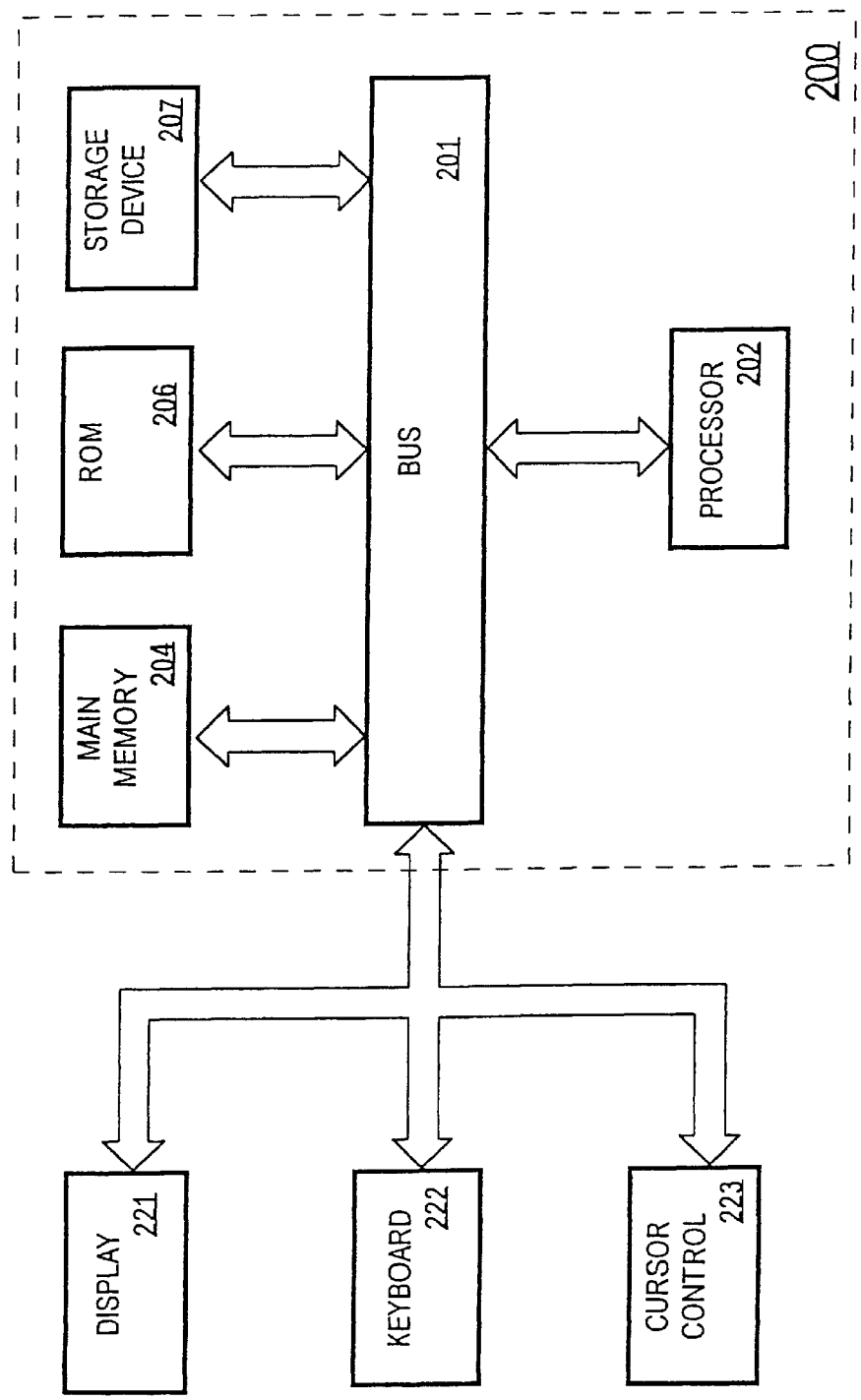
FIG. 2 is a block diagram of a computer system on which the present invention may be implemented.

FIG. 2 illustrates a block diagram of a computer system 200 upon which an embodiment of the present invention may be implemented. Computer system 200 includes a bus 201 or other communication mechanism for communicating information, and a processor 202 coupled with bus 201 for processing information. Computer system 200 further comprises a random access memory (RAM) or other dynamic storage device 204 (referred to as main memory), coupled to bus 201 for storing information and instructions to be executed by processor 202. Main memory 204 also may be used for storing temporary variables or other intermediate information during execution of instructions by processor 202. Computer system 200 also includes a read only memory (ROM) and/or other static storage device 206 coupled to bus 201 for storing static information and instructions for processor 202. A data storage device 207, such as a magnetic disk or optical disk, is coupled to bus 201 for storing information and instructions.

Computer system 200 may also be coupled via bus 201 to a display device 221, such as a cathode ray tube (CRT), for displaying information to a computer user. An alphanumeric input device 222, including alphanumeric and other keys, is typically coupled to bus 201 for communicating information and command selections to processor 202. Another type of user input device is cursor control 223, such as a mouse, a trackball, or cursor direction keys for communicating direction information and command selections to processor 202 and for controlling cursor movement on display 221. This input device typically has two degrees of freedom in two axes, a first axis (e.g., x) and a second axis (e.g., y), which allows the device to specify positions in a plane.

Alternatively, other input devices such as a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 222 wherein all interface is provided via the stylus as a writing instrument (like a pen) and the written text is interpreted using optical character recognition (OCR) techniques.

The present invention is related to the use of computer system 200 to manage dependencies in a distributed environment to ensure compatibility during remote procedure calls. According to one embodiment, the management of dependencies is performed by computer system 200 in response to processor 202 executing sequences of instructions contained in memory 204. Such instructions may be read into memory 204 from another computer-readable medium, such as data storage device. Execution of the sequences of instructions contained in memory 204 causes processor 202 to perform the process steps that will be described hereafter. In alternative embodiments, hard-wired circuitry may be used in place of or in combination with software instructions to implement the present invention. Thus, the present invention is not limited to any specific combination of hardware circuitry and software.

Functional Overview

According to one embodiment of the invention, a method is provided for managing dependencies in a distributed computing environment to ensure the safety of remote procedure calls between a calling procedure and a target procedure.

Generally, this is accomplished by providing both an expected time stamp and an expected signature in each remote procedure call. The expected time stamp contains the creation time of the target procedure and is stored by the calling procedure each time it is compiled. The expected signature contains data type information of the target procedure formal parameters at the time the calling procedure was last compiled.

Figure 3:
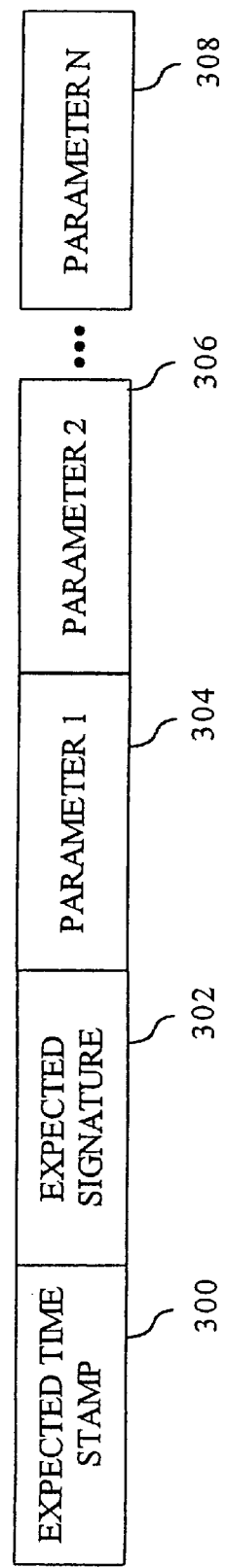
FIG. 3 illustrates the contents of a remote procedure call according to an embodiment of the present invention.

FIG. 3 illustrates the information included in a remote procedure call according to an embodiment of the present invention. This information includes an expected time stamp 300, expected signature 302, parameter1 304, and parameter2 306 through parameterN 308. As indicated by the 1,2 . . . N nomenclature, the remote procedure call may contain any number of parameters, 304, 306, 308, of any type, such as integer, floating point, character strings, data structures or any other data type.

Figure 4A:
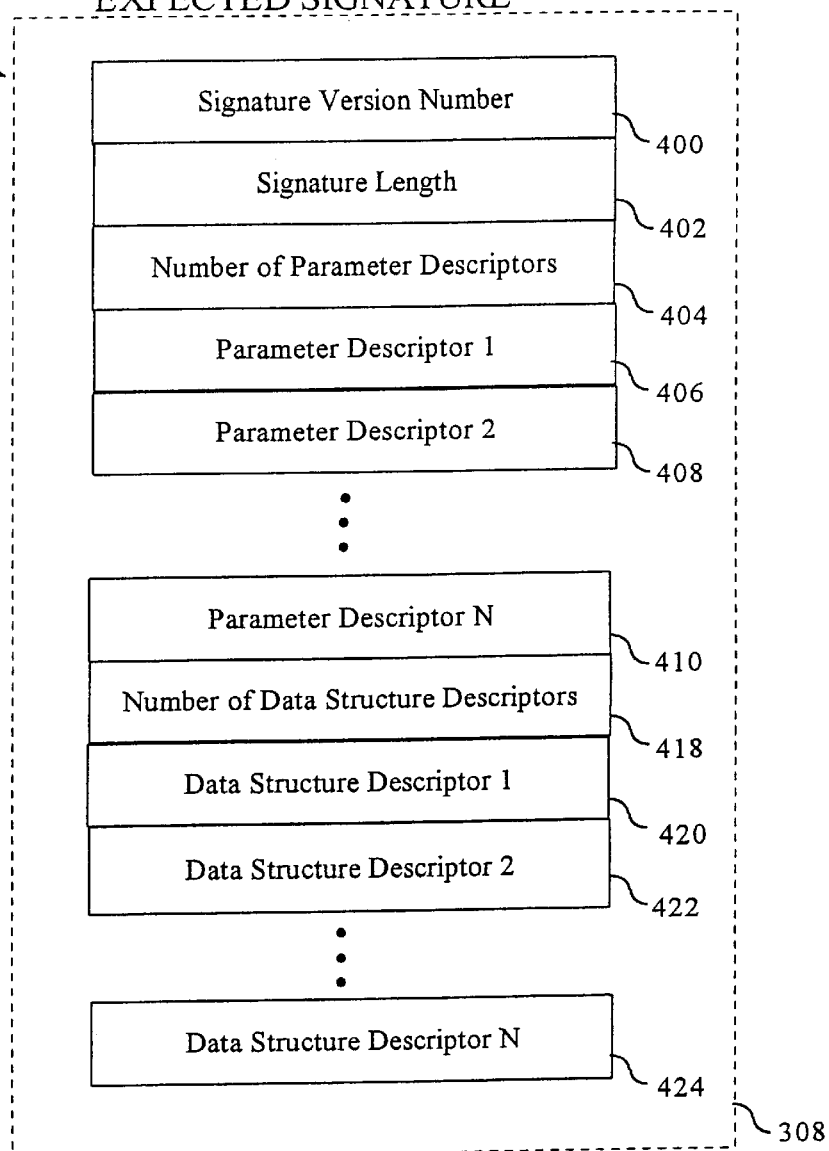
FIG. 4A illustrates the expected signature of the contents of the remote procedure call illustrated in FIG. 3.

As illustrated in FIG. 4A, to fully describe the data type information of the target procedure formal parameters, the expected signature 302 includes several fields. The first field is a signature version number 400 which specifies the signature version being used so that different software throughout the distributed environment may properly decode the signature information. The second field is the signature length 402 which designates the length of the expected signature.

Following the signature length 402 is the number of parameter descriptors 404 included in the expected signature 302. Immediately following this field are the actual parameter descriptors including parameter descriptor 1 406 and parameter descriptor 2 408 through parameter descriptor N 410. Each of the parameter descriptors 406, 408, 410 corresponds to one of the call parameters 304, 306, 308 (FIG. 3) contained in the remote procedure call. However, any number of parameter descriptors may be provided depending upon the number and data types of the parameters passed in the remote procedure call. For example, an index table may have two parameter descriptors. The first parameter descriptor may define the index table itself, while the second parameter descriptor may define the individual index table elements.

Figure 4B:
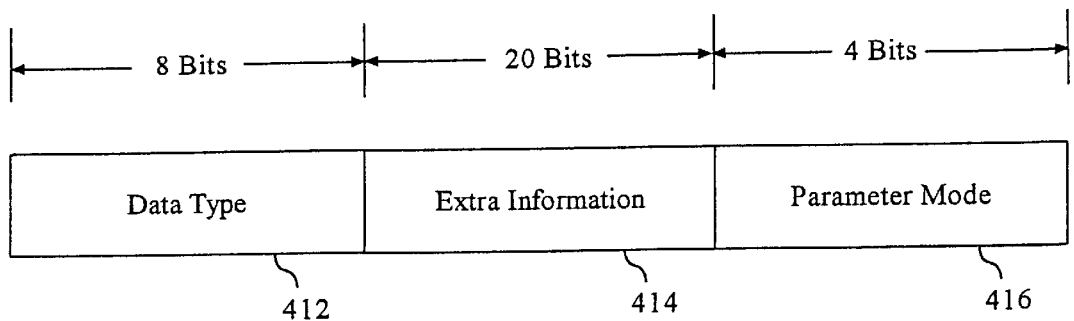
FIG. 4B illustrates one of the parameter descriptors illustrated in FIG. 4A.

As illustrated in FIG. 4B, each of the parameter descriptors 406, 408, 410 includes a data type field 412, an extra information field 414 and a parameter mode field 416. The data type field 412 indicates the data type such as integer, floating point, character or other data structure of the parameter that corresponds to the parameter descriptor. The extra information field 414 stores any additional information about the parameter that corresponds to the parameter descriptor. Finally, the parameter mode field 416 indicates whether the parameter is used locally in the target procedure, returned to the calling procedure, or both.

In one particular embodiment of the present invention, the data type field 412 is an eight bit integer, the extra information field 414 is comprised of 20 bits of data and the parameter mode field 416 is comprised of four bits of data. However, the number of bits allocated to each field may vary depending on the particular application, without departing from the scope of the present invention.

Referring back to FIG. 4A, the expected signature 308 also provides information for any formal parameters which are data structures. Specifically, the expected signature 308 includes a number of data structure descriptors 418 followed by data structure descriptor 1 420, data structure descriptor 2 422 through data structure descriptor N 424. These fields contain information on any data structures included in the remote procedure call.

Turning now to FIG. 4C which illustrates an example of a signature for a target procedure defined by the pseudo code statement "procedure TARGET1 (p1 IN binary_integer, p2 IN OUT char)". Target procedure TARGET1 is expecting to receive two parameters from a calling procedure. These include P1, an input binary integer and P2, an input/output character. The table provides an example of how this information is represented in a signature according to one particular embodiment of the present invention. Of course, other encoding schemes may be used depending upon the specific application.

The unique approach to ensuring the safety of remote procedure calls in a distributed computing environment according to an embodiment of the present invention includes two levels of dependency checking for providing tight dependency checking or looser dependency checking. A user selectable dependency switch indicates whether tight dependency checking is to be applied using time stamps or whether a looser level of dependency checking is to be applied using signatures. The dependency switch may be implemented in hardware, firmware, software or any combination thereof. The operation of the dependency switch is described in more detail below.

Figure 5:
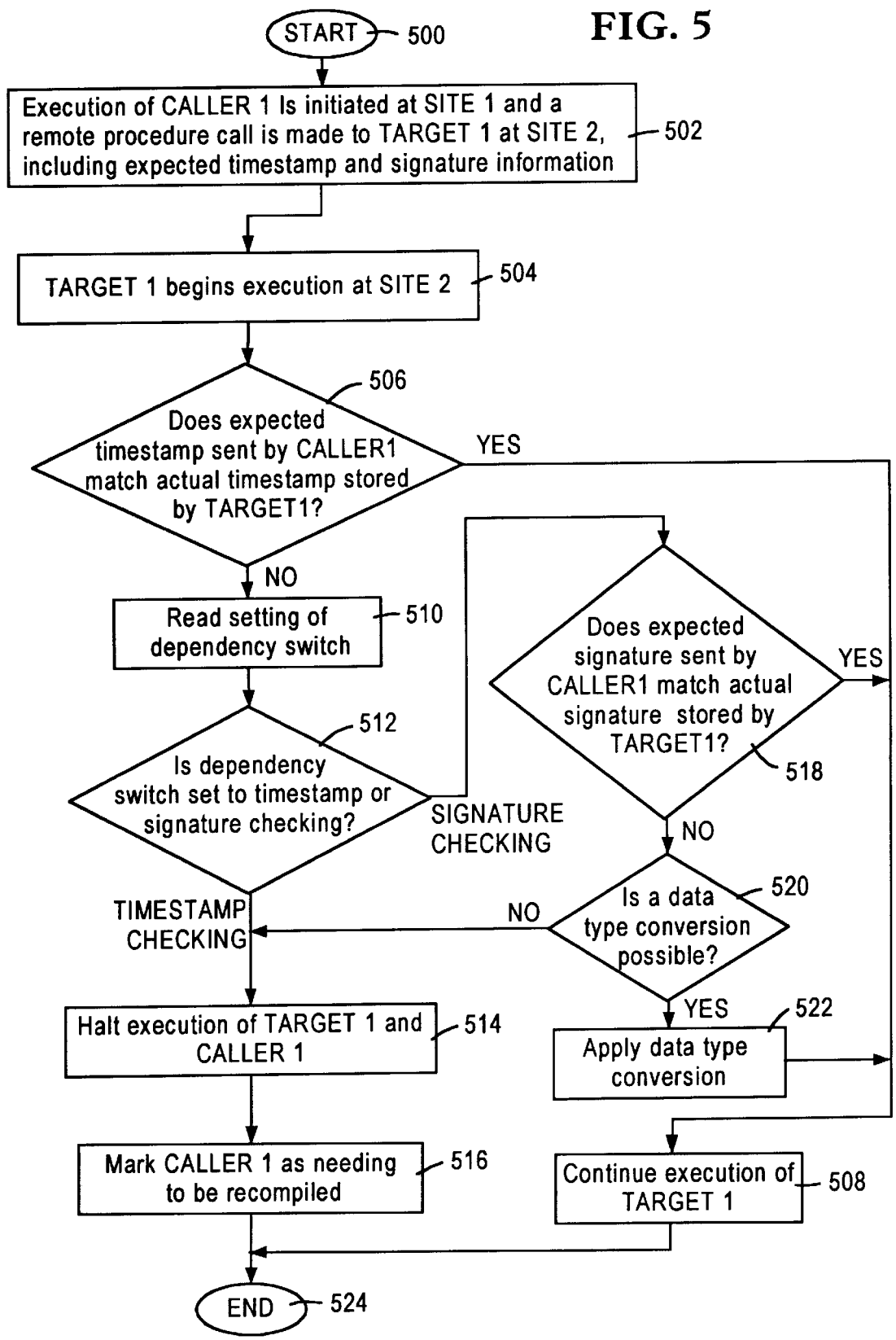
FIG. 5 is a flow chart illustrating a method for managing dependencies in a distributed computing environment to ensure the safety of remote procedure calls according to an embodiment of the present invention.

FIG. 5 illustrates a flow chart of the steps performed to manage dependencies in a distributed computing environment to ensure the safety of remote procedure calls according to an embodiment of the present invention. After entering in step 500, in step 502 the execution of a calling procedure, CALLER1 is initiated at SITE1 and a remote procedure call is made to a target procedure TARGET1 at SITE2. The remote procedure call includes an expected time stamp, stored by CALLER1, which contains the creation time of TARGET1 at the time CALLER1 was last compiled. The remote procedure call also includes an expected signature, stored by CALLER1, which contains data type and passing mode information of the formal parameters for TARGET1 at the time CALLER1 was last compiled.

In step 504 TARGET1 begins execution at SITE2 in response to the remote procedure call from CALLER1. In step 506 the expected time stamp from CALLER1 is compared to the actual time stamp stored by TARGET1. If the expected time stamp matches the actual time stamp, then TARGET1 has not been recompiled since CALLER1 was last recompiled and the execution of TARGET1 continues in step 508. If, on the other hand, in step 506 the expected time stamp does not match the actual time stamp stored by TARGET1, then TARGET1 has been recompiled since CALLER1 was last recompiled and a dependency switch setting is read in step 510.

In step 512 the dependency switch setting is evaluated to determine whether it is set to time stamp or signature checking. If the dependency switch is set to time stamp checking then execution of both TARGET1 and CALLER1 is halted in step 514 and in step 516 CALLER1 is marked as needing to be recompiled. Processing of the remote procedure call is then completed in step 524.

If, on the other hand, in step 512 the dependency switch is set to signature checking, then in step 518 the expected signature sent by CALLER1 is compared to the actual signature stored by TARGET1. If the signatures match, then even though TARGET1 has been recompiled since CALLER1 was last recompiled, the data types and passing modes of the formal parameters of CALLER1 and TARGET1 are still compatible and execution of TARGET1 continues normally in step 508. If, on the other hand, in step 518, it is determined that the expected signature sent by CALLER1 does not match the actual signature stored by TARGET1, then in step 520 TARGET1 compares the data types and passing modes of the parameters passed from CALLER1 to the data types and passing modes expected by TARGET1 to determine whether the data received can be converted to the correct type. If the data can be successfully converted, then the data is converted in step 522 and the execution of TARGET1 continues normally in step 508. For example, if CALLER1 sends an integer value and for that particular parameter TARGET1 expects a double precision value, then the data type conversion from integer to double precision value would be successful. If, on the other hand, in step 520 the data type conversion is not possible, then the execution of TARGET1 and CALLER1 is halted in step 514 followed by the marking of CALLER1 as needing to be recompiled in step 516. Processing of the remote procedure call is then completed in step 524.

The method and apparatus for managing dependencies in a distributed computing environment to ensure the safety of remote procedure calls according to the present invention has significant advantages over the prior solutions. First, the present method guarantees the safety of remote procedure calls through the use of time stamp and signature matching. In addition, the adverse effects on performance are minimal because of the relatively small amount of additional overhead added to each remote procedure call to include the time stamp and signature information. Moreover, the compatibility checks are performed before any of the parameters are processed. This is particularly useful if the time stamps match exactly or if signature checking is selected and the signatures match exactly. On the other hand, the signature checking option allows data type conversions to be attempted and applied if successful. This becomes particularly important when a site does not have a compiler and the change made to the target procedure is a benign change, such as a change in comment statement or an internal statement to the procedure which does not effect the parameter protocol.

The approach described herein also provides significant advantages in the area of maintainability over prior solutions. Specifically, since the signature field may be left blank, the remote procedure calls remain compatible with older target procedures which just use time stamp checking. Similarly, if an older calling procedure does not provide the signature, the target procedure simply shift protocols and require that the time stamps match. Finally, the remote procedure call protocol is somewhat divorced from the meta-data. Specifically, if the semantics of the given type change, the remote procedure call protocol does not have to change. Rather, only the signature changes.

Although the present invention has been illustrated in the context of software running at different physical sites, the solution provided by the approach described herein is equally effective for different software tasks running at the same site.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing a remote procedure call from a calling procedure to a target procedure, the method comprising the steps of:

a) sending first and second sets of data from said calling procedure to said target procedure;
b) performing a first test based on the first set of data to determine whether said target procedure is version compatible with the calling procedure;
c) if said first test succeeds, then executing the target procedure; and
d) if said first test fails, then
   i) performing a second test based on the second set of data to determine whether the target procedure is version compatible with the calling procedure, and
   ii) if said second test succeeds, then executing the target procedure.

2. The method of claim 1 wherein:
the first set of data identifies an expected version of the target procedure; and
the step of performing the first test includes determining whether the expected version of the target procedure matches an actual version of the target procedure.

3. The method of claim 1 wherein the step of performing the second test includes determining whether a first set of parameters that the calling procedure experts the target procedure to support is compatible with a second set of parameters that are actually supported by the target procedure.

4. The method of claim 1 further comprising performing the following steps if the first test fails:
reading a switch;
if said switch is in a first state, then performing second test; and
if said switch is in a second state, then aborting execution of said target procedure without performing the second test.

5. The method of claim 1, wherein the method further includes enabling a remote procedure call from the calling procedure to the target procedure and wherein the method further comprises the step of recording the first and second sets of data.

6. The method as recited in claim 1, wherein the second test requires a relatively greater amount of system resources to perform than the first test.

7. The method of claim 2 wherein:
the first set of data is an expected time stamp; and
the step of determining whether the expected version of the target procedure matches the actual version of the target procedure includes comparing the expected time stamp to an actual time stamp associated with said target procedure.

8. A method for performing a remote procedure call from a calling procedure to a target procedure, the method comprising the steps of:
a) sending an expected time stamp and an expected signature from the calling procedure to the target procedure, wherein the expected time stamp is indicative of the creation time of the target procedure at the time the calling procedure was last created and wherein the expected signature is indicative of the data types and passing modes of the formal parameters of the target procedure at the time the calling procedure was last generated; and
b) comparing the expected time stamp to an actual time stamp and comparing the expected signature to an actual signature to determine whether the calling procedure and the target procedure are compatible wherein the actual time stamp is indicative of the last time the target procedure was created and wherein the actual signature is indicative of data types and passing modes of the formal parameters of the target procedure.

9. The method of claim 8, further comprising the step of allowing continued execution of the target procedure if the expected time stamp matches the actual time stamp.

10. The method of claim 8, further comprising the steps of:
a) reading a dependency switch to determine the type of checking desired; and
b) if the dependency switch indicates time stamp checking and if the expected time stamp does not match the actual time stamp then preventing further execution of the target procedure and the calling procedure.

11. The method of claim 8, further comprising the steps of:
a) reading a dependency switch to determine the type of checking desired; and
b) if the dependency switch indicates signature checking and if the expected signature matches the actual signature, then allowing continued execution of the target procedure.

12. The method of claim 8, further comprising the steps of:
a) reading a dependency switch to determine the type of checking desired;
b) if the dependency switch indicates signature checking and if the expected signature does not match the actual signature then determining whether data received from the calling procedure can be successfully converted into a data type required by the target procedure; and
c) if the successful data conversion is possible, then converting the data received from the calling procedure into the format required by the target procedure.

13. The method of claim 8, further comprising the steps of:
a) reading a dependency switch to determine the type of checking desired;
b) if the dependency switch indicates signature checking and if the expected signature does not match the actual signature then determining whether data received from the calling procedure can be successfully converted into a data type required by the target procedure; and
c) if the successful data conversion is not possible, then preventing further execution of the target procedure and the calling procedure.

14. The method of claim 8, wherein:
the method further comprises the steps of:
a) storing the expected time stamp each time the calling procedure is compiled, and
b) storing the expected signature each time the calling procedure is compiled.

15. The method of claim 8, further comprising the steps of:
a) allowing continued execution of the target procedure if the expected time stamp matches the actual time stamp;
b) if the expected time stamp and actual time stamps do not match, reading a dependency switch; and
c) if the dependency switch indicates time stamp checking then preventing further execution of the target procedure and the calling procedure and marking the calling procedure as needing to be regenerated.

16. The method of claim 8, further comprising the steps of:
a) allowing continued execution of the target procedure if the expected time stamp matches the actual time stamp;

b) if the expected time stamp and actual time stamps do not match, reading a dependency switch;

c) if the dependency switch indicates time stamp checking, then preventing further execution of the target procedure and the calling procedure and marking the calling procedure as needing to be regenerated; and d) if the dependency switch indicates signature checking, comparing the expected signature to the actual signature and if the expected signature matches the actual signature, then allowing continued execution of the target procedure.

17. The method as recited in claim 8, wherein the step of comparing the expected signature to the actual signature requires a relatively greater amount of system resources to perform than the step of comparing the expected time stamp to the actual time stamp.

18. The method of claim 10, further comprising the step of marking the calling procedure as needing to be regenerated if the dependency switch indicates time stamp checking and if the expected time stamp does not match the actual time stamp.

19. The method of claim 13, wherein the step of preventing further execution of the target procedure and the calling procedure further comprises the step of marking the calling procedure as needing to be regenerated.

20. The method of claim 16, further comprising the steps of:

a) if the expected signature does not match the actual signature, determining whether data received from the calling procedure may be successfully converted into a data type required by the target procedure;

b) if the successful data conversion is possible, then converting the data received from the calling procedure into the format required by the target procedure; and c) if the successful conversion is not possible, preventing further execution of the target procedure and the calling procedure and marking the calling procedure as needing to be recompiled.

21. A computer-readable medium having stored thereon a plurality of sequences of instructions, the plurality of sequences of instructions including sequences of instructions which, when executed by one or more processors, cause the one or more processors to perform the steps of:

a) sending an expected time stamp and an expected signature from the calling procedure to the target procedure, wherein the expected time stamp is indicative of the creation time of the target procedure at the time the calling procedure was last created and wherein the expected signature is indicative of the data types and passing modes of the formal parameters of the target procedure at the time the calling procedure was last generated; and b) comparing the expected time stamp to an actual time stamp and comparing the expected signature to an actual signature to determine whether the calling procedure and the target procedure are compatible, wherein the actual time stamp is indicative of the last time the target procedure was created and wherein the actual signature is indicative of data types and passing modes of the formal parameters of the target procedure.

22. The computer-readable medium of claim 21, wherein the computer-readable medium further includes instructions for allowing continued execution of the target procedure if the expected time stamp matches the actual time stamp.

23. The computer-readable medium of claim 21, wherein the computer-readable medium further includes instructions for:

a) reading a dependency switch to determine the type of checking desired; and b) if the dependency switch indicates time stamp checking and if the expected time stamp does not match the actual time stamp, then preventing further execution of the target procedure and the calling procedure.

24. The computer-readable medium of claim 21, wherein the computer-readable medium further includes instructions for:

a) reading a dependency switch to determine the type of checking desired; and b) if the dependency switch indicates signature checking and if the expected signature matches the actual signature then allowing continued execution of the target procedure.

25. The computer-readable medium of claim 21, wherein the computer-readable medium further includes instructions for:

a) reading a dependency switch to determine the type of checking desired;

b) if the dependency switch indicates signature checking and if the expected signature does not match the actual signature then determining whether data received from the calling procedure may be successfully converted into a data type required by the target procedure; and c) if the successful data conversion is possible, then converting the data received from the calling procedure into the format required by the target procedure.

26. The computer-readable medium of claim 21, wherein the computer-readable medium further includes instructions for:

a) reading a dependency switch to determine the type of checking desired;

b) if the dependency switch indicates signature checking and if the expected signature does not match the actual signature then determining whether data received from the calling procedure may be successfully converted into a data type required by the target procedure; and c) if the successful data conversion is not possible, then preventing further execution of the target procedure and the calling procedure.

27. The computer-readable medium of claim 19, wherein: the computer-readable medium further includes instructions for:

a) storing the expected time stamp each time the calling procedure is compiled; and b) storing the expected signature each time the calling procedure is compiled.

28. The computer-readable medium of claim 21, wherein the computer-readable medium further includes instructions for:

a) allowing continued execution of the target procedure if the expected time stamp matches the actual time stamp;

b) if the expected time stamp and actual time stamps do not match, reading a dependency switch; and c) if the dependency switch indicates time stamp checking then preventing further execution of the target procedure and the calling procedure and marking the calling procedure as needing to be regenerated.

29. The computer-readable medium of claim 21, wherein the computer-readable medium further includes instructions for:

a) allowing continued execution of the target procedure if the expected time stamp matches the actual time stamp;

b) if the expected time stamp and actual time stamps do not match, reading a dependency switch;

c) if the dependency switch indicates time stamp checking, then preventing further execution of the target procedure and the calling procedure and marking the calling procedure as needing to be regenerated; and d) if the dependency switch indicates signature checking, comparing the expected signature to the actual signature and if the expected signature matches the actual signature, then allowing continued execution of the target procedure.

30. The computer-readable medium of claim 23, wherein the computer-readable medium further includes instructions for marking the calling procedure as needing to be regenerated if the dependency switch indicates time stamp checking and if the expected time stamp does not match the actual time stamp.

31. The computer-readable medium of claim 26, wherein the instructions for preventing further execution of the target procedure and the calling procedure further includes instructions for marking the calling procedure as needing to be regenerated.

32. The computer-readable medium of claim 29, wherein the computer-readable medium further includes instructions for:

a) if the expected signature does not match the actual signature, determining whether data received from the calling procedure may be successfully converted into a data type required by the target procedure;

b) if the successful data conversion is possible, then converting the data received from the calling procedure into the format required by the target procedure; and c) if the successful conversion is not possible, preventing further execution of the target procedure and the calling procedure and marking the calling procedure as needing to be recompiled.

33. A distributed computing environment comprising:

a) a calling procedure; and b) a target procedure, wherein remote procedure calls between the calling procedure and the target procedure include an expected time stamp, indicative of the creation time of the target procedure at the time the calling procedure was last compiled, and an expected signature, indicative of data types and passing modes of formal parameters of the target procedure at the time the calling procedure was last compiled.

34. A method for performing a remote procedure call from a calling procedure to a target procedure, the method comprising the steps of:

sending an expected time stamp and an expected signature from the calling procedure to the target procedure, wherein the expected time stamp is indicative of a creation time of the target procedure at the time the calling procedure was last created and the expected signature is indicative of data types and passing modes of the formal parameters of the target procedure at the time the calling procedure was last generated;

performing a first test by comparing the expected time stamp to an actual time stamp to determine whether the target procedure is version compatible with the calling procedure, wherein the actual time stamp is indicative of the last time the target procedure was created;

if the first test succeeds, then executing the target procedure; and if the first test fails, then performing a second test by comparing the expected signature to an actual signature to determine whether the target procedure is version compatible with the calling procedure, wherein the actual signature is indicative of data types and passing modes of the formal parameters of the target procedure and if said second test succeeds, then executing the target procedure.

35. A computer-readable medium carrying one or more sequences of one or more instructions for performing a remote procedure call from a calling procedure to a target procedure, the one or more sequences of one or more instructions including instructions which, when executed by one or more processors, cause the one or more processors to perform the steps of:

a) sending first and second sets of data from said calling procedure to said target procedure;

b) performing a first test based on the first set of data to determine whether said target procedure is version compatible with the calling procedure;

c) if said first test succeeds, then executing the target procedure; and d) if said first test fails, then i) performing a second test based on the second set of data to determine whether the target procedure is version compatible with the calling procedure, and ii) if said second test succeeds, then executing the target procedure.

36. The computer-readable medium as recited in claim 35, wherein:

the first set of data identifies an expected version of the target procedure; and the step of performing the first test includes determining whether the expected version of the target procedure matches an actual version of the target procedure.

37. The computer-readable medium as recited in claim 35, wherein the step of performing the second test includes determining whether a first set of parameters that the calling procedure expects the target procedure to support is compatible with a second set of parameters that are actually supported by the target procedure.

38. The computer-readable medium as recited in claim 35, further comprising instructions which, when executed by the one or more processors, cause the one or more processors to performing the following steps if the first test fails:

reading a switch;

if said switch is in a first state, then performing second test; and if said switch is in a second state, then aborting execution of said target procedure without performing the second test.

39. The computer-readable medium as recited in claim 35, further comprising instructions which, when executed by the one or more processors, cause the one or more processors to enable a remote procedure call from the calling procedure to the target procedure and wherein the method further comprises the step of recording the first and second sets of data.

40. The computer-readable medium as recited in claim 35, wherein the second test requires a relatively greater amount of system resources to perform than the first test.

41. The computer-readable medium as recited in claim 36, wherein:

the first set of data is an expected time stamp; and the step of determining whether the expected version of the target procedure matches the actual version of the target procedure includes comparing the expected time stamp to an actual time stamp associated with said target procedure.

* * * * *